United States Patent [19]
Melcher

[11] 3,805,042
[45] Apr. 16, 1974

[54] MULTIPLICATION OF A BINARY-CODED NUMBER HAVING AN EVEN RADIX WITH A FACTOR EQUAL TO HALF THE RADIX

[76] Inventor: Domenic Melcher, Bonstettenstr. 26, Uster, Switzerland

[22] Filed: Aug. 22, 1972

[21] Appl. No.: 282,863

[30] Foreign Application Priority Data
May 24, 1972 Switzerland........................ 7686/72

[52] U.S. Cl................................. 235/156, 235/159
[51] Int. Cl............................................. G06f 7/52
[58] Field of Search............................ 235/156, 159

[56] References Cited
UNITED STATES PATENTS

| | | | |
|---|---|---|---|
| 3,251,983 | 5/1966 | Constant et al.................... | 235/159 |
| 3,456,098 | 7/1969 | Gomez et al.................... | 235/159 X |
| 3,495,075 | 2/1970 | Leal et al........................ | 235/156 X |

*Primary Examiner*—Felix D. Gruber
*Assistant Examiner*—David H. Malzahn
*Attorney, Agent, or Firm*—Stevens, Davis, Miller & Mosher

[57] ABSTRACT

An electronic device for the multiplication of a binary-coded number of a system of numbers having an even radix greater than 2, with the factor equal to half the radix of said system of numbers, wherein the different order bits are simultaneously transmitted through parallel channels and represented consecutively under the control of a clock pulse.

1 Claim, 1 Drawing Figure

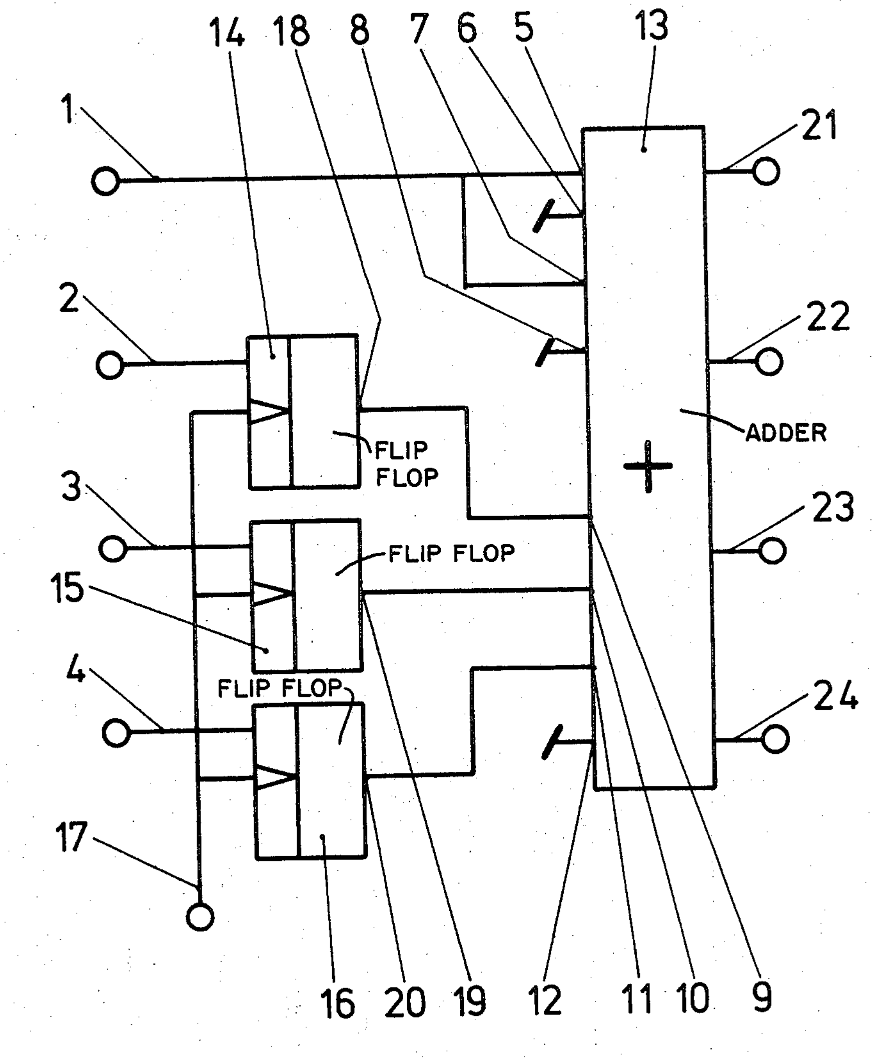
14 18 8 7 6 5 13
1
21
2
22
FLIP FLOP
ADDER
3
FLIP FLOP
23
15
4
FLIP FLOP
24
17
16 20 19 12 11 10 9

MULTIPLICATION OF A BINARY-CODED NUMBER HAVING AN EVEN RADIX WITH A FACTOR EQUAL TO HALF THE RADIX

The present invention relates to an electronic device for the multiplication of a binary-coded number of a system of numbers having an even radix greater than 2, with a factor equal to half the radix of said system of numbers, wherein the different order bits are simultaneously transmitted through parallel channels and represented consecutively under the control of a clock pulse.

Data transmission in parallel channels — usually at least four associated in a tetrade — and the multiplication of such coded numbers are both known in the art. If the base of the system of numbers is 10, i.e. if the system is the decimal system, then the coding system is known as the binary coded decimal system, generally abbreviated BCD system. However, frequently numbers in the octal or hexa-decimal system (radix 8 and 16, respectively) are also coded in the binary system. If it is desired to multiply such a number with a fixed factor dictated by the purpose of the arrangement, then the following possibilities are available in the art. If the fixed factor is a 2 then the multiplication can be reduced to the addition of the number to itself and suitable circuit arrangements are known which will accomplish this. If the factor is equal to the radix of the binary coded numerical system, then the multiplication is achieved by delaying the parallel pulse trains by one clock pulse. However, if the factor is neither a 2 nor the radix of the number system, then the multiplication is not performed by a special method but, in the usual way, by repeated addition. The factor must then be freshly introduced for each multiplication or read out of a special memory device.

When multiplying a binary-coded number of a system having the radix $b$ with the factor $b/2$, then $b/2$ cannot be represented as the product of 2 and $b$. The factor $b/2$ must either be reintroduced for each multiplication or stored in the computer in such a way that it can be read out when required. This requires the provision of a memory and a complete multiplier device. Since such repeated multiplications with a fixed factor — here specifically with $b/2$ — occur primarily in small computer installations used as single purpose computers in conjunction with measuring instruments and therefore lacking a data memory, the fixed factor in such a case must be available in a special memory. Such memory devices are referred to in the art as read-only memories. The expenditure in electronic components and functional groups is therefore considerable and in principle the same whether the fixed factor is $b/2$ or any arbitrary number in relation to $b$.

It is the object of the present invention to perform the multiplication of a binary-coded number in a system having the even-numbered radix $b$, with the factor $b/2$ in an electronic computer with a minimum of electronic components. The proposed device is characterised in that it comprises an adder designed for adding two binary-coded numbers of the system of numbers used, and a number of electronic delaying circuits for delaying the potential pulses by one clock pulse, said number of delaying circuits being one less than the number of parallel channels required for representing the system of numbers, the parallel channel transmitting the lowest order bit being directly connected to the adder inputs for one term of the sum, which together correspond to the value of half the radix of the system of numbers used, and the other parallel channels being each taken to one of the electronic delaying circuits which by one clock pulse delay the potential pulses arriving through the parallel channels and representing the logic state ONE, and of which the outputs are connected to the adder inputs for the second term, which have a binary value that is lower by a power of two than that of the parallel channels in which the number was originally represented.

In the accompanying drawing an embodiment of the proposed device is schematically shown. The illustrated arrangement is based on the following mathematical relationship.

Let $z$ be a number in a system having an even-numbered radix $b$, $$z = \Sigma a_i b^i$$

where $i = 0, 1 \ldots$ $0 \leq a_i \leq b - 1$.

This number is tetradically transmitted so that in each cycle a coefficient $a_i$ is always represented in four parallel channels in the selected code, starting with $a_o$.

If $z$ is now to be multiplied with $b/2$ then each coefficient must be serially multiplied with $b/2$.

$$z \cdot b/2 = b/2\ (a_a b^o + a_1 b^1 + a_2 b^2 + \ldots)$$

Let $c_i$ be the coefficients of the product $(z \cdot b/2)$ thus $z \cdot (b/2) = c_0 b^0 + c_1 b^1 + c_2 b^2 + \ldots$ then $c_o$ can have only one of two possible values, namely 0 and $b/2$:

| $a_o$ | $a_o \,.\, b/2$ $c_o$ | Carry |
|---|---|---|
| 0 | 0 | 0 |
| 1 | $b/2$ | 0 |
| 2 | O | 1 |
| 3 | $b/2$ | 1 |
| 4 | O | 2 |
| . | . | . |
| . | . | . |
| $b-1$ | $b/2$ | $b/2-1$ |

For even-numbered values of $a_o : c_o = 0$, for odd-numbered values of $a_o : c_o = b/2$. The maximun possible carry is $b/2 - 1$.

For the multiplication of the next higher power of $b$ with $b/2$ similar tables apply based on the relationship $$c_i = p_i + u_{i-1}$$

| $a_i$ | $p_i$ | $a_i \,.\, b/2$ Carry |
|---|---|---|
| 0 | 0 | 0 |
| 1 | $b/2$ | 0 |
| 2 | 0 | 1 |
| 3 | $b/2$ | 1 |
| . | . | . |
| . | | . |
| $b-1$ | b/2 | $b/2-1$ |

It will be apparent that the sum of $p_i$ and the carry $u_{i-1}$ in the last digit can have the maximum value of $$c_{imax} = p_{imax} + u_{i-1max} = (b/2-1) + b/2 = b - 1$$

No carry into the next power but one of the radix $b$ can therefore arise.

From these relationships the following multiplication rules derive for the general term $a_i$ since the coefficients $a_i$ appear serially.

1. If $a_i$ is an even number, $p_i = 0$
   if $a_i$ is odd, $p_i = b/2$.
2. The value of the carry $u_i$ is determined by division by 2 of the coefficient $a_i$ rounded off to the next lower even number.
3. The coefficient $c_i$ of the product is obtained from the sum $$c_i = p_i + u_{i-1}$$

The coefficient $a_0$ is first examined whether it is even or odd. If it is odd, a voltage which corresponds to the logic state ONE appears at the time of the clock pulse in the channel corresponding to the lowest order bit. This is for instance through wire connections, so applied to the following adder which is designed for adding two tetrades that this voltage appears at those inputs of one tetrade of the adder which in binary digits represent the number $b/2$. The voltage pulses which simultaneously appear in the three other channels, and which in the event of $a_0$ being odd together represent the value $a_a-1$ and otherwise $a_0$ itself, are delayed by one clock pulse and then so applied to the inputs of the hitherto unused augmend tetrade of the adder, for instance through wire connections, that they are reduced by one digital order (division by 2), a procedure which yields the term $u_i$. This operation is performed on all coefficients $a_i$ of the number $z$ in one clock pulse. The selected circuitry automatically forms the sum $$c_i = p_i + u_{i-1}$$

The block diagram of such a multiplier is illustratively shown in the accompanying drawing. The code used is the binary-coded decimal system (BCD). The bit orders in the several channels of the tetrade are 1, 2, 4, 8, corresponding to the powers $2^0, 2^1, 2^2, 2^3$. Conventional means ensure that the integers 10 to 15, which are possible as such, are suppressed. The radix of the number $z$ is therefore 10 and $b/2$ is 5. Thus $p_i$ can assume only the values 0 or 5, and for $u_i$ the values 0, 1, 2, 3, 4 are available. Since $c_i = p_i + u_{i-1}$, the range of values available for $c_i$ is 0 to 9.

Four channels 1, 2, 3, 4 together form a tetrade for serially representing the coefficients $a_i$. A voltage which corresponds to logic ONE, has the value $2^0 = 1$ in channel 1, the value $2^1 = 2$ in channel 2, the value $2^2 = 4$ in channel 3 and the value $2^3 = 8$ in channel 4. Channel 1 is branched and applies the voltages corresponding to the logic states ZERO and ONE to inputs 5 and 7 of an adder 13. The inputs 5, 6, 7, 8, together form the tetrade of the addend of the sum, whereas the inputs 9, 10, 11, 12 form that of the augmend. The bit value of the inputs 9 and 5 is $2^0 = 1$, that of the inputs 10 and 6 is $2^1 = 2$, that of the inputs 11 and 7 is $2^2 = 4$ and that of the inputs 12 and 8 is $2^3 = 8$. Since channel 1 is connected to both inputs 5 and 7, a 5 is formed at this input tetrade of the adder 13 when a ONE appears in channel 1. The channels 2, 3, 4, are each taken to the input of flip-flops 14, 15, 16, respectively. The pulses of a clock pulse generator not shown are injected into a line 17 and control flip flops 14, 15, 16 so that voltage pulses corresponding to the logic state ONE appear in their outputs 18, 19, 20 only when, during the preceding cycle of the clock pulse generator corresponding voltages were present in channels 2 or 3 or 4. Since the flip-flop outputs 18 and 19 and 20 are connected to the inputs 9, 10, 11, respectively, of the augmend tetrade which have bit orders one order below — i.e. by a factor 2 — the bit orders in channels 2, 3 and 4, a division by 2 is effected. The number $z$ which has now been quintupled is delivered in the BCD-code into channels 21, 22, 23, 24 where channel 21 has the bit order $2^0 = 1$, channel 22 the order $2^1 = 2$, channel 23 the order $2^2 = 4$ and channel 24 the order $2^3 = 8$.

The inputs 6, 8, 12 of the adder 13 are not used and are conductively connected to that voltage which represents the logic state ZERO.

I claim:

1. Apparatus for multiplying a binary coded number, of a system of numbers having an even radix greater than 2, with a factor equal to one-half the radix of said system of numbers, comprising:

adding means for adding two binary coded numbers of said system of numbers;

a plurality of parallel channels for simultaneously transmitting the different order bits of said numbers, the channel representing the lowest order bit of said system of numbers being coupled directly to said adding means to form one term of the sum of said numbers corresponding to the value of one-half the radix of said system of numbers;

a plurality of delay circuits, the number of said delay circuits being one less than the number of said parallel channels required to represent said system of numbers, a first input of each of said delay circuits being coupled to a corresponding one of said parallel channels; and clock pulse means coupled to a second input of said delay circuits, wherein an output signal, having a logic state ONE, is generated at the outputs of appropriate ones of said delay circuits, corresponding to the signals appearing on said first inputs of said delay circuits, by a clock pulse appearing on said second inputs;

the outputs of said delay circuits being coupled to the corresponding inputs of said adding means representing a second term of the sum of said two numbers and having a binary value that is lower by a power of two than the binary value of the number appearing on the parallel channels.

* * * * *